(No Model.)
G. E. HUMPHREYS.
SPROCKET AND CHAIN GEARING.
No. 588,577. Patented Aug. 24, 1897.
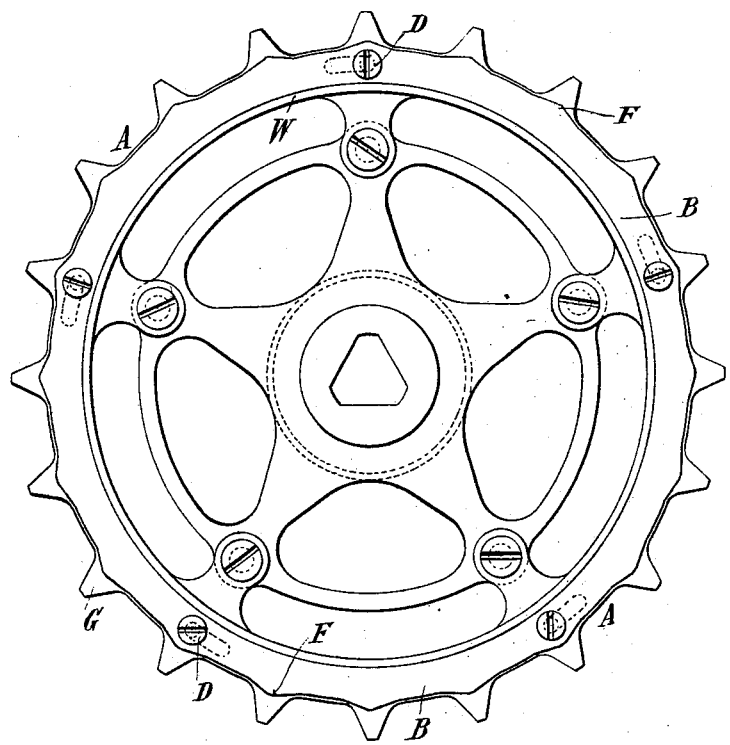
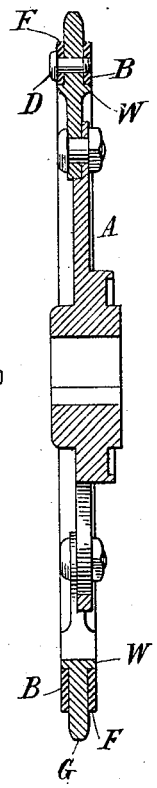
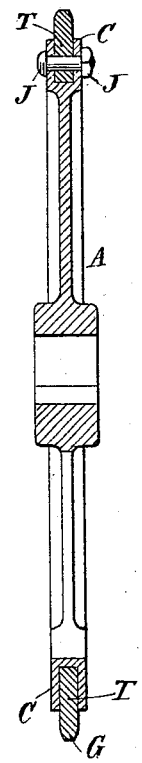
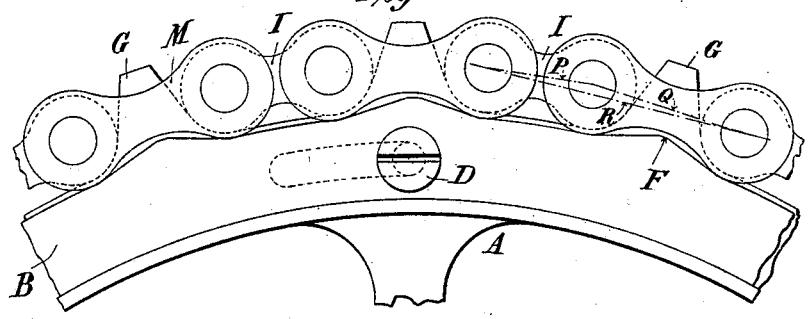
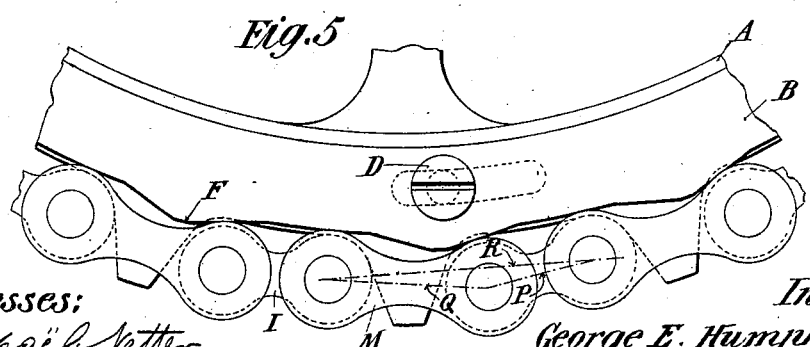
Witnesses:
Raphaël Vetter
Edwin B. Hopkinson.
Inventor:
George E. Humphreys
by Kerr, Curtis & Page attys

UNITED STATES PATENT OFFICE.

GEORGE E. HUMPHREYS, OF ILION, NEW YORK.

SPROCKET-AND-CHAIN GEARING.

SPECIFICATION forming part of Letters Patent No. 588,577, dated August 24, 1897.

Application filed March 18, 1897. Serial No. 628,177. (No model.)

*To all whom it may concern:*

Be it known that I, GEORGE E. HUMPHREYS, a citizen of the United States, residing at Ilion, in the county of Herkimer and State of New York, have invented certain new and useful Improvements in Sprocket-and-Chain Gearing, of which the following is a specification, reference being had to the drawings accompanying and forming a part of the same.

It has been observed by every rider of a bicycle that however perfectly the sprocket-and-chain gearings may run when new their action is impaired by continued use. In such forms of gearing as customarily manufactured the teeth of the sprockets are cut a trifle small to insure perfectly free running; but after a time the wear and stretch of the chain cause an increase in pitch, so that it no longer fits the sprocket, and as a consequence the friction is increased and great annoyance caused by the chain riding on the faces of the sprocket-teeth and slipping down with a noisy snap as each chain-block under the applied tension draws down into its proper bearing-point on the sprocket. This condition is aggravated in proportion to the length of time the wheel is in service.

The object of my present invention is to provide a means of correcting such variation in pitch between chain-and-sprocket wheels in general, and which may be caused either by use and wear or due to imperfections or variations in manufacture, and to this end I provide an attachment for a sprocket-wheel by means of which the relation of the wheel and chain may be adjusted so as to compensate for the slightest wear or stretch of chain or wear on the sprocket-teeth by the adjustment of the bearing-points of the chain on the sprocket in the manner hereinafter set forth, whereby there may be maintained a perfect pitch relation between the two at all times.

In the accompanying drawings, which illustrate the invention in its simplest and preferred form, Figure 1 is a side view of my improved sprocket. Fig. 2 is a cross-section of the same. Fig. 3 is a cross-section of a modified form of the sprocket. Figs. 4 and 5 are side views of portions of my improved sprocket-wheels, on an enlarged scale, to illustrate the principle of the invention.

The invention may be carried out by the employment of means for accomplishing the same object in substantially the same manner of widely different mechanical construction, and I have therefore illustrated only typical forms.

One of such forms is represented in Figs. 1 and 2, in which plates or rings B are secured to one or both sides of the sprocket-wheel A and near the periphery of the same by means such as screws D, which pass through slots in the wheel and permit of a limited adjustment of the plate or plates concentrically with the wheel. To facilitate the concentric adjustment of the plate or plates B, I usually form the sprocket-wheels with concentric shoulders W, over which the rings B fit. The edges of the rings B are formed or provided with cam-like projections F in positions corresponding to those of the sprocket-teeth, the plates B being normally secured in such position that the said projections register with the teeth, while the peripheral portions of the rings intermediate to the projections are flush with or slightly above or below the corresponding portions of the edge of the sprocket-wheel.

As a modification of this plan of construction I have shown in Fig. 3 a sprocket-wheel with separated sides or formed with a peripheral groove, the sides C of which have edges formed with projections or cams similar to those on the plates B. A toothed ring T is fitted in the groove and secured by bolts and nuts J, which pass through holes in the toothed ring and slots in the sides of the recess in the wheel.

In both forms while under the normal conditions the projections or cams and sprocket-teeth register or occupy corresponding radial positions. This relation may be varied by loosening the screws or nuts and turning the plates B or toothed ring T, as the case may be, concentrically with the wheel. It will be understood that either the rings B or toothed ring may be made in sections. The purpose of this and the results secured thereby will be explained by reference to Figs. 4 and 5. In Fig. 4 it will be observed that the center or driving links I bear against the faces of the teeth G, and by such points of contact either drive or are driven by the sprocket, while the connecting or side links M rest upon the peripheries of the rings B.

The pitch-line of a chain is an imaginary line drawn through the centers of the rivets or pivotal pins. Hence the pitch-line of an ordinary bicycle-chain encircling a sprocket-wheel forms a polygon of unequal sides, in which the lines P, Fig. 4, joining the pivotal centers of the center or driving links I' form one series of sides and the lines Q, joining the pivotal centers of the connecting or side links, form the other series of sides. The pitch is measured from the pivotal center of the working end of one driving or center link to the pivotal center of the working end of the next center link or each alternative pivotal center. The relative distance between the faces of the sprocket-teeth remains constant, as the wear on each is practically equal. Uniform wear of the teeth, therefore, will not materially alter the pitch; but with the chain it is obvious that by reason of wear and stretch the length of the lines P and Q would be increased, making the distance of line R as measured on the chain greater than the distance between the corresponding points on the sprocket-wheel.

The pitch-line of each pair or series of links forms a triangle P Q R, of which R is the base, the normal conditions being those represented in Fig. 4; but assume that by wear and stretch the chain has increased the length of the lines P and Q, it follows that the distance R has also increased and the proper pitch is no longer preserved. To restore the proper relations and bring the line R back to its proper length with relation to the sprocket-teeth, the rings B are loosened and adjusted so as to bring the cams or projections F out of register with the teeth and into positions where they will lie to a greater or less extent under the ends of the side links E, increasing the altitude of the triangle P Q R until R is shortened to its original measurement and assumes its original position in relation to the sprocket-wheel. This is illustrated in Fig. 5.

The essential feature of the invention being, as will now be seen, to increase the radial distance from the center of the wheel of the bearing-points of the chain upon the sprocket-teeth by the concentric adjustment of the bearing-points with relation to the teeth, in order to preserve the proper distance between the working pivotal centers of the chain, it is evident that the specific character of the means for effecting this becomes of secondary importance.

What I claim is—

1. A sprocket-wheel having edges upon which the chain-links rest and formed or provided with projections or cams, the said edges and teeth being concentrically adjustable with relation to each other, as set forth.

2. The combination with a sprocket-wheel of rings or annular plates forming supports for the side links of the chain, the peripheries of said plates being formed or provided with cams or projections and the plates being secured to the sprocket with the capability of concentric adjustment thereon, as set forth.

3. The combination with a sprocket-wheel having concentric shoulders W, of a ring or rings B, having cams or projections on their peripheries and forming supports for the chain-links, and the screws or bolts D passing through slots in the wheel or rings and securing the rings to the wheel with the capability of concentric adjustment, as set forth.

GEORGE E. HUMPHREYS.

Witnesses:
HAZEN W. BRADLEY,
EUGENE D. RIVERS.